Patented Sept. 15, 1953

2,652,384

UNITED STATES PATENT OFFICE 2,652,384

**COMPOSITION OF A PREMILLED BUTA-
DIENE - ACRYLONITRILE COPOLYMER
AND A NONRUBBERY THERMOPLASTIC
SYNTHETIC RESIN**

Andrew F. Sayko and John R. Briggs, Westfield,
N. J., assignors to Standard Oil Development
Company, a corporation of Delaware No Drawing. Application April 12, 1949,
Serial No. 87,138

11 Claims. (Cl. 260—45.5)

This invention relates to thermoplastic molding compositions and more especially to thermoplastic compositions comprising, in combination, a relatively soft, elastic (i. e., normally extensible an self-retractible to substantially original size and shape) synthetic rubber and certain thermoplastic synthetic resins which are hard and inelastic, that is, non-elastic (non-rubbery) polymers at ordinary temperatures. The final products range in flexibility from those resembling soft leather to very tough, hard, yet resilient, molding compositions, according to the resin to synthetic rubber ratio.

U. S. Patent No. 2,439,202 describes the preparation of thermoplastic compositions by mixing butadiene-acrylonitrile copolymer with a styrene-acrylonitrile copolymer. However, the resulting composition is baggy and possesses a rough, grainy surface and is not easily workable.

The present invention is particularly concerned with a thermoplastic composition composed essentially of a blend, that is, a homogeneous mixture of a normally rubbery copolymer of butadiene-1,3 and acrylonitrile, with a hard, thermoplastic resinous polymer or copolymer which is non-rubbery at room temperatures, and which may even be brittle at room temperatures, e. g., polystyrene, polyvinyl chloride, a copolymer of styrene and isobutylene, as described in U. S. Patent No. 2,274,749, a copolymer of styrene and butadiene and a copolymer of styrene and acrylonitrile as described in U. S. Patent No. 2,140,048.

The elastic synthetic rubber component is a 1,3-butadiene-acrylonitrile copolymer type rubber and is disclosed in U. S. Patent No. 1,937,000 and is a well-known article of commerce. According to the present invention the synthetic rubber component is given a pretreatment prior to its incorporation into the synthetic resin component.

In accordance with the present invention, a series of butadiene-acrylonitrile copolymers were subjected to Mooney viscosity and gel content tests with the following results:

| Polymer | 2 min. Mooney at 212° F. | Percent gel |
|---|---|---|
| Aa | 91 | 5.24 |
| Ab | 76 | 2.29 |
| Ac | 55 | 1.30 |
| Ae | 131 | 68.2 |
| Af | 165 | 100 |
| Ba | 74 | .04 |
| Bb | 53 | |
| Bd | 46 | 20.7 |
| Be | [1] 32 | 38.2 |
| Ca | 62 | 26.5 |
| Cb | 41 | |
| Cd | 74 | 54.5 |
| Ce | 92 | 74.6 |
| Da | 80 | 43.2 |
| Db | 64 | |
| Dd | 104 | 55.0 |
| De | 106 | 75.7 |

[1] Low Mooney due to breakdown in absence of a heat stabilizer.
A—butadiene (65%)-acrylonitrile(35%) copolymer.
B—butadiene(82%)-acrylonitrile(18%) copolymer.
C—butadiene(74%)-acrylonitrile(26%) copolymer.
D—butadiene(65%)-acrylonitrile(35%) copolymer (low Mooney).
a—no breakdown.
b—polymer broken down on cold mill.
c—polymer plasticized with xylyl mercaptan in a OO Banbury mixer for 10 minutes at a temperature of 330° F.
d—milled for 15 minutes at a temperature of 330° F.
e—milled for 30 minutes at a temperature of 330° F.
f—milled for 10 minutes at a temperature of 330° F.

From the above results it is evident that heat treatment at 330° F. increases the gel content of the polymer.

The hard, thermoplastic resin component is mixed with the pre-milled synthetic rubber on a rubber mill, Banbury mixer, or other suitable mixing apparatus in proportions by weight ranging from 25 to 90% of the resin rubber composition. As the amount of the hard resin is increased, the hardness, toughness, and the tensile strength of the resultant composition increases. The mixtures containing in the range of 25 to 50% by weight of the hard resin result in tough, flexible, leather-like materials while those containing above 50% and up to 90%, of the resin rubber mix, result in molding compositions which can be shaped or formed to any desired contour with even pressure. All of the compositions are smooth and pliable and very easily worked.

The following example illustrates the beneficial effect of the pre-milling on the final composition.

Each of the butadiene-acrylonitrile (65–35%) copolymers (polymer A) was blended with five different resins in the proportion of 70% resin and 30% butadiene-acrylonitrile polymer. In each case the resin was first banded on the hot mill with subsequent addition of the butadiene-acrylonitrile polymers. The performance of each blend is summarized below:

| Polymer used | Milling characteristics of blend |
|---|---|
| Aa | Stock became baggy after Perbunan addition. A rough, grainy surface was observed after thorough mixing. |
| Ab | Slight bagging during Perbunan addition. Medium smooth surface with some grain after mixing. |
| Ac | Slight rough and dry during the early mixing stage. Continued milling produced a very rough surface. |
| Ae | Blending was rapid with no evidence of bagging. A smooth, workable stock resulted. |
| Af | Blending was rapid with no bagging. The resulting mix was smooth and workable. |

In order to further demonstrate processing variations in the various blends an extrusion study was performed with the #½ Royle extruder. A constant speed of 80 R. P. M. was held throughout the test. Pre-heatd strips were provided by means of a warm-up mill.

The listed data show the comparative extrusion rates and physical appearance of the extruded rods:

the polystyrene, making the milling operation much easier.

Increases in extrusion rate of the order of 42% and 34% were obtained by employing high gel polymers in the isobutylene-styrene polymer resins. Although these resins perform satisfactorily on the mill, a smoother working blend results from the use of the treated polymers.

With polyvinyl chloride the trend toward higher extrusion rates and lower tube swell is again apparent. Gains of 76% and 105% are realized by the substitution of the modified polymers.

The styrene-butadiene copolymer resin has excellent processing properties of its own. The addition of treated butadiene-acrylonitrile rubber, however, augments these properties considerably. Extremely high extrusion rates and very low swell values are obtained. Increased smoothness and flexibilty are given in each case by the gelled polymers.

The gel reported in the above experiments was obtained in the following manner:

About 0.2 g. of polymer (accurately weighed to at least ±.001 g.) is cut into cubes of about 1 mm. on the edge and placed in a 125 ml. Erlenmeyer flask. One hundred ml. of benzene is then added to the flask, after which it is stored in the dark and at room temperature for 48 hours. At no time are the flask and its contents agitated to hasten dissolution of the polymer.

A filter is prepared from 250 mesh stainless steel or Monel metal screen. A section of the screen 3.5″ in diameter is cut out and folded

*Extrusion properties of butadiene-acrylonitrile copolymer-resin blends*

| Polymer | Styrene-acrylonitrile copolymer—Extrusion properties at 315° F. | | | Polystyrene—Extrusion properties at 285° F. | | | Copolymer 40% isobutylene–60% styrene—Extrusion properties at 260° F. | | | Polyvinyl chloride—Extrusion properties at 280° F. | | | Styrene-butadiene copolymer—Extrusion properties at 230° F. | | | Appearance |
|---|---|---|---|---|---|---|---|---|---|---|---|---|---|---|---|---|
| | Inches/min. | Grams/min. | Grams/in. | Inches/min. | Grams/min. | Grams/in. | Inches/min. | Grams/min. | Grams/in. | Inches/min. | Grams/min. | Grams/in. | Inches/min. | Grams/min. | Grams/in. | |
| Aa | 41 | | | | | | | | | | | | | | | Rough and pliable. |
| Ab | 56 | | | | | | | | | | | | | | | Do. |
| Ac | 55 | | | | | | | | | | | | | | | Do. |
| Ae | 74 | | | | | | | | | | | | | | | Smooth and pliable. |
| Af | 71 | | | | | | | | | | | | | | | Do. |
| Ba | | | | 16.7 | 72.3 | 4.33 | 24.0 | 93.7 | 3.90 | | | | | | | |
| Bb | | | | 17.2 | 77.6 | 4.51 | 22.7 | 95.5 | 4.21 | | | | | | | |
| Bd | | | | 17.8 | 80.6 | 4.53 | 23.5 | 96.1 | 4.09 | | | | | | | |
| Be | | | | 19.3 | 94.5 | 4.90 | 22.1 | 106.5 | 4.81 | | | | | | | |
| Ca | | | | 18.5 | 83.2 | 4.50 | 24.0 | 99.7 | 4.15 | 31.9 | 84.9 | 2.66 | 96.0 | 112.0 | 1.16 | Smooth. |
| Cb | | | | 17.2 | 84.0 | 4.88 | 23.0 | 98.1 | 4.27 | 38.5 | 92.4 | 2.40 | | | | |
| Cd | | 64 | 106.4 | 1.66 | 20.5 | 85.3 | 4.16 | 29.3 | 114.6 | 3.91 | 41.3 | 73.6 | 1.78 | 104.0 | 117.2 | 1.13 | Very Smooth. |
| Ce | | | | 23.0 | 84.8 | 3.69 | 34.0 | 112.8 | 3.31 | 56.0 | 93.4 | 1.67 | 112.0 | 115.8 | 1.03 | |
| Da | | 77 | 126.1 | 1.64 | 14.0 | 66.8 | 4.77 | 29.7 | 104.8 | 3.52 | 31.3 | 64.5 | 2.06 | 81.0 | 106.4 | 1.31 | |
| Db | | | | 12.9 | 61.9 | 4.80 | 27.8 | 106.0 | 3.81 | 38.0 | 73.1 | 1.92 | 95.0 | 116.5 | 1.22 | |
| Dd | | | | 16.0 | 74.9 | 4.68 | 32.8 | 116.3 | 3.54 | 64.3 | 114.6 | 1.78 | 105.0 | 117.0 | 1.11 | |
| De | | | | 16.1 | 72.3 | 4.49 | 40.0 | 122.5 | 3.06 | 52.0 | 78.4 | 1.51 | 120.0 | 122.4 | 1.02 | |

From the above data it is evident that both the butadiene-74%-acrylonitrile-26% resin and butadiene-65%-acrylonitrile-35% resin demonstrate an improvement in the processability of resin blends when the nitrile polymers have been heat-treated to produce high Mooney and gel values. The processing advantage is shown by the higher extrusion rates and the lower swell of the tubes. Data for blends with polystyrene show approximately a 22% and a 15% rate increase for the addition of the heat-treated butadiene-74%-acrylonitrile-26% resin and the heat-treated butadiene-65%-acrylonitrile-35% resin. The high gel polymers also served to decrease the tack of as filter paper. This folded screen is then placed in a 50 ml. beaker and brought to constant weight by heating for a few hours in an air or vacuum oven.

The screen, after weighing, is placed in a funnel and the contents of the flask swirled a few times and then poured through it. The flask is rinsed with about 20 ml. of solvent and this is also poured over the residue on the screen. When solvent has stopped dripping from the screen, it is returned to the tared beaker and weighed. In making this weighing, 1½ minutes are allowed to elapse from the time solvent has ceased draining to the time the weighing is made. Since solvent is lost rapidly during this time, the balance can be adjusted so as to enable one to obtain weights at the given time in each measurement. This weight should be reproducible to 0.01 g.

After weighing the beaker, screen and wet gel, they are placed in an oven and brought to constant weight. Thus the percent gel in the polymer is calculated as follows:

$$\text{Percent gel} = \frac{(\text{wt. beaker}+\text{screen}+\text{dry gel}) - (\text{wt. beaker}+\text{screen})}{\text{initial polymer weight}} \times 100$$

$$= \frac{\text{wt. dry gel}}{\text{initial polymer wt.}}$$

The swelling index is defined as follows:

$$\text{Swelling index} = \frac{(\text{wt. beaker}+\text{screen}+\text{wet gel})}{(\text{wt. beaker}+\text{screen}+\text{dry gel})} = \frac{\text{wt. wet gel}}{\text{wt. dry gel}}$$

The nature and objects of the present invention having thus been set forth and specific examples of the same given, what is claimed as new and useful and desired to be secured by Letters Patent is:

1. A composite thermoplastic homogeneous composition consisting of a mixture of a normally rubbery copolymer of butadiene-1,3, and acrylonitrile which has been separately premilled at 330° F., for 10 to 30 minutes and a hard normally thermoplastic resin chosen from the class consisting of polystyrene, polyvinyl chloride, a copolymer of styrene and isobutylene, and a copolymer of styrene and acrylonitrile, said thermoplastic resin comprising from 25 to 90% by weight and said rubber copolymer correspondingly comprising from 75 to 10% of the rubber-resin mixture.

2. Product according to claim 1 in which the resin is present to the extent of 70% by weight and said rubbery copolymer to the extent of 30% and in which the rubbery copolymer is milled for 15 minutes at 330° F., prior to being mixed with said resinous copolymer.

3. Product according to claim 2, in which the resin is a copolymer of styrene and acrylonitrile.

4. Product according to claim 2, in which the resin is a copolymer of styrene and isobutylene.

5. Product according to claim 2, in which the resin is polystyrene.

6. Product according to claim 2, in which the resin is polyvinyl chloride.

7. The process which comprises milling a normally elastic rubbery butadiene-acrylonitrile copolymer at a temperature of 330° F., for 10 to 30 minutes and combining the mixture of rubbery copolymer solely with a normally inelastic thermoplastic resin selected from the group consisting of polystyrene, polyvinyl chloride, styrene-acrylonitrile copolymer, isobutylene-styrene copolymer, and styrene-butadiene copolymer, said thermoplastic resin comprising from 25 to 90% by weight and said rubbery copolymer correspondingly comprising from 75 to 10% of the rubber-resin mixture.

8. Process according to claim 7 in which the resin is a copolymer of styrene and acrylonitrile.

9. Process according to claim 7 in which the resin is a copolymer of styrene and isobutylene.

10. Process according to claim 7 in which the resin is polystyrene.

11. Process according to claim 7 in which the resin is polyvinyl chloride.

ANDREW F. SAYKO.
JOHN R. BRIGGS.

References Cited in the file of this patent

UNITED STATES PATENTS

| Number | Name | Date |
|---|---|---|
| 2,439,202 | Daly | Apr. 6, 1948 |
| 2,459,739 | Groten et al. | Jan. 18, 1949 |
| 2,505,349 | Daly | Apr. 25, 1950 |
| 2,600,024 | Romeyn et al. | June 10, 1952 |

OTHER REFERENCES

White et al.: Ind. & Eng. Chem., pp. 770–775, August 1945.

Schoene et al.: Ind. & Eng. Chem., pp. 1246–1249, December 1946.

Young et al.: Ind. & Eng. Chem., pp. 1446–1448, November 1947.

Schmidt and Marlies: "Principles of High Polymer Theory and Practice," p. 268, pub. 1948, by McGraw-Hill Book Co., N. Y.